United States Patent [19]

Oeming

[11] Patent Number: 4,467,681
[45] Date of Patent: Aug. 28, 1984

[54] CHUCK MECHANISM

[76] Inventor: Joseph A. Oeming, 220 Reynick, Saginaw, Mich. 48602

[21] Appl. No.: 231,733

[22] Filed: Feb. 5, 1981

[51] Int. Cl.³ .................... B23B 31/02; B23B 31/18
[52] U.S. Cl. .................... 82/40 A; 269/227; 269/268; 279/1 DC; 279/33; 279/34
[58] Field of Search ............. 82/9, 38 R, 40 R, 39 R, 82/40 A, 57; 279/1 DC, 33, 34; 269/227, 287, 268, 156; 294/86 R, 103 R

[56] References Cited

U.S. PATENT DOCUMENTS

| 239,047 | 3/1881 | Hyde ........................ 279/34 |
| 685,933 | 11/1901 | Neumann ................... 82/40 R |
| 809,513 | 1/1906 | Lodge et al. .............. 51/238 S |
| 2,333,180 | 11/1943 | Holmes ..................... 279/57 |
| 2,576,420 | 11/1951 | Simonsen .................. 269/227 |
| 2,624,611 | 1/1953 | Knapp ...................... 294/103 R |
| 2,670,646 | 3/1954 | Kendall et al. ............ 82/40 A |
| 3,257,880 | 6/1966 | Hermann ................... 82/40 A |
| 3,766,812 | 10/1973 | McEwne ................... 82/40 R |
| 3,785,228 | 1/1974 | Clagett et al. . |
| 3,808,653 | 5/1974 | Oeming et al. . |
| 3,929,368 | 12/1975 | Ryden et al. .............. 294/103 R |
| 3,965,780 | 6/1976 | Yamada . |
| 3,986,745 | 10/1976 | Langguth .................. 294/103 R |
| 4,044,638 | 8/1977 | Heffron et al. . |
| 4,099,431 | 7/1978 | Kreucher . |
| 4,157,055 | 6/1979 | Marzy . |
| 4,171,654 | 10/1979 | Kreucher . |
| 4,179,775 | 12/1979 | Fujita ....................... 279/33 |

FOREIGN PATENT DOCUMENTS

| 21550 | 5/1883 | Fed. Rep. of Germany ........ 279/34 |
| 75308 | 8/1893 | Fed. Rep. of Germany ........ 279/34 |
| 92266 | 10/1897 | Fed. Rep. of Germany ........ 279/34 |
| 219861 | 4/1924 | United Kingdom ................. 279/34 |

Primary Examiner—Leonidas Vlachos
Assistant Examiner—Jerry Kearns
Attorney, Agent, or Firm—Gifford, VanOphem, Sheridan, Sprinkle & Nabozny

[57] ABSTRACT

A chuck mechanism for holding a workpiece during a machining operation comprising a frame, a stop block secured to the frame and an annular jaw slidably mounted within an annular channel in the frame. The jaw is movable between a clamping position in which a workpiece is held between the jaw and the stop block, and a nonclamping position. Preferably, the jaw includes a first sector and a second sector secured together by interlocking but spaced apart flanges. The flanges permit limited annular movement between the sectors.

11 Claims, 3 Drawing Figures

CHUCK MECHANISM

BACKGROUND OF THE INVENTION

I. Field of the Invention

The present invention relates generally to chucks for holding a workpiece during a machining operation upon the workpiece and, more particularly, to such a chuck having a jaw which is displaced by a rotatably driven member.

II. Description of the Prior Art

Accurate machining of workpieces often requires that the workpiece be clamped in a stationary position so that a cutting tool abuts against and machines the workpiece. The rigid clamping of the workpiece becomes especially important, although more difficult, when the workpiece is irregularly shaped and/or includes a plurality of surfaces to be machined such as a crankshaft on which the main bearings as well as the crank pins must be machined.

Since the crankshaft main bearings are aligned on the major axis of the crankshaft, the ends of the crankshaft are conventionally held by coaxially aligned spindles. The crankshaft is then rotated between the spindles while a cutting tool machines the main bearing surfaces. However, the crank pins of the crankshaft lie on an axis parallel to but spaced apart from the major axis of the crankshaft. Thus, the crankshaft must be rotated about the axis of the crank pins in order to machine the crank pins.

A previously known chuck device for holding crankshafts during a machining operation comprises two clamping jaws which engage the main bearing or the crank pin of the crankshaft. The jaws are attached to one end of a pivoting lever while the other end of the lever contacts a cam surface of a linearly movable member which is driven by a piston and cylinder arrangement. An example of such a chuck is described in U.S. Pat. Nos. 4,171,654 and 4,099,431 to Kreucher.

These previously known chuck devices, however, are disadvantageous in that they are complicated by the fact that the motivating force for closing and opening is a linear actuating device whose motion must be changed to a rotary motion by means of cams. Such previously know devices are also bulky and require frequent maintenance.

Another previously known chuck is disclosed in U.S. Pat. No. 4,044,638 to Heffron et al in which three radially spaced chuck jaws are shown and in which each jaw is secured to one end of a linearly movable arm which controls the actuation of the jaws. This type of previously known chuck suffers substantially the same disadvantages as the previously discussed chuck. Moreover, the use of three moving jaws requires accurate alignment of each of the jaws and thus makes the device extremely complicated and expensive.

SUMMARY OF THE PRESENT INVENTION

The chuck of the present invention includes a frame which is secured to the spindle of a rotary drive means so that the frame and spindle rotate together. The frame supports an axially adjustable center adapted to engage either end of the part. The center is axially slidably mounted to the frame between an extended and a retracted position. With the center in its extended position, the crankshaft is locked between the centers at the opposite end of the part. The frame also includes at least one support block disposed below the axis between the centers.

A torque shaft is rotatably mounted to the frame below the support block and includes a geared end positioned beneath the support block. The gear teeth of the torque shaft mesh with a toothed portion of an arcuate clamping jaw arm which is arcuately movably mounted in a channel in the frame. A gear is attached to the opposite end of the torque shaft. A driving gear meshes with the gear on the torque shaft. The driving gear teeth are machined in a tube. This tube is driven by a reversible motor.

The arcuate jaw arm preferably comprises two parts, a ring gear sector and a jaw arm sector, arranged in an end-to-end relationship. The sectors are provided with extended, overlapping flanges at their adjacent ends so that the sectors can be displaced with respect to each other for a slight distance in the arcuate path of movement. Such a construction permits the application of a percussive or breaking force to disengage the jaw from the workpiece.

The center advances and retracts by means of a separate reversible motivating device. A screw and nut are mounted inside a movable center quill. This center quill operates inside the driving gear tube. By rotating the screw the center quill advances and retracts with the driving gear tube and operates independently of the driving gear tube.

Once the centers engage the ends of the crankshaft, the driving gear tube is rotatably driven by a reversible motor. The driving gear thus rotatably drives the torque shaft which, in turn, arcuately displaces the jaw arm in its channel. As the jaw is arcuately displaced, it abuts against the crankshaft and firmly presses the crankshaft against the support blocks and locks the crankshaft in the stable position required for a machining operation.

When the driving gear tube is rotated in the opposite direction, the arcuate jaw arm disengages from the workpiece. In the preferred embodiment, the ring gear sector is initially displaced with respect to the jaw arm sector but the overlapping flanges eventually slap against each other and separate the jaw arm sector from the workpiece with a percussive or breaking force.

BRIEF DESCRIPTION OF THE DRAWING

The present invention will be more clearly understood by reference to the following detailed description of a preferred embodiment of the present invention when read in conjunction with the accompanying drawing in which like reference characters refer to like parts throughout several views and in which.

DETAILED DESCRIPTION OF A PREFERRED EMBODIMENT OF THE PRESENT INVENTION

Figure 1:
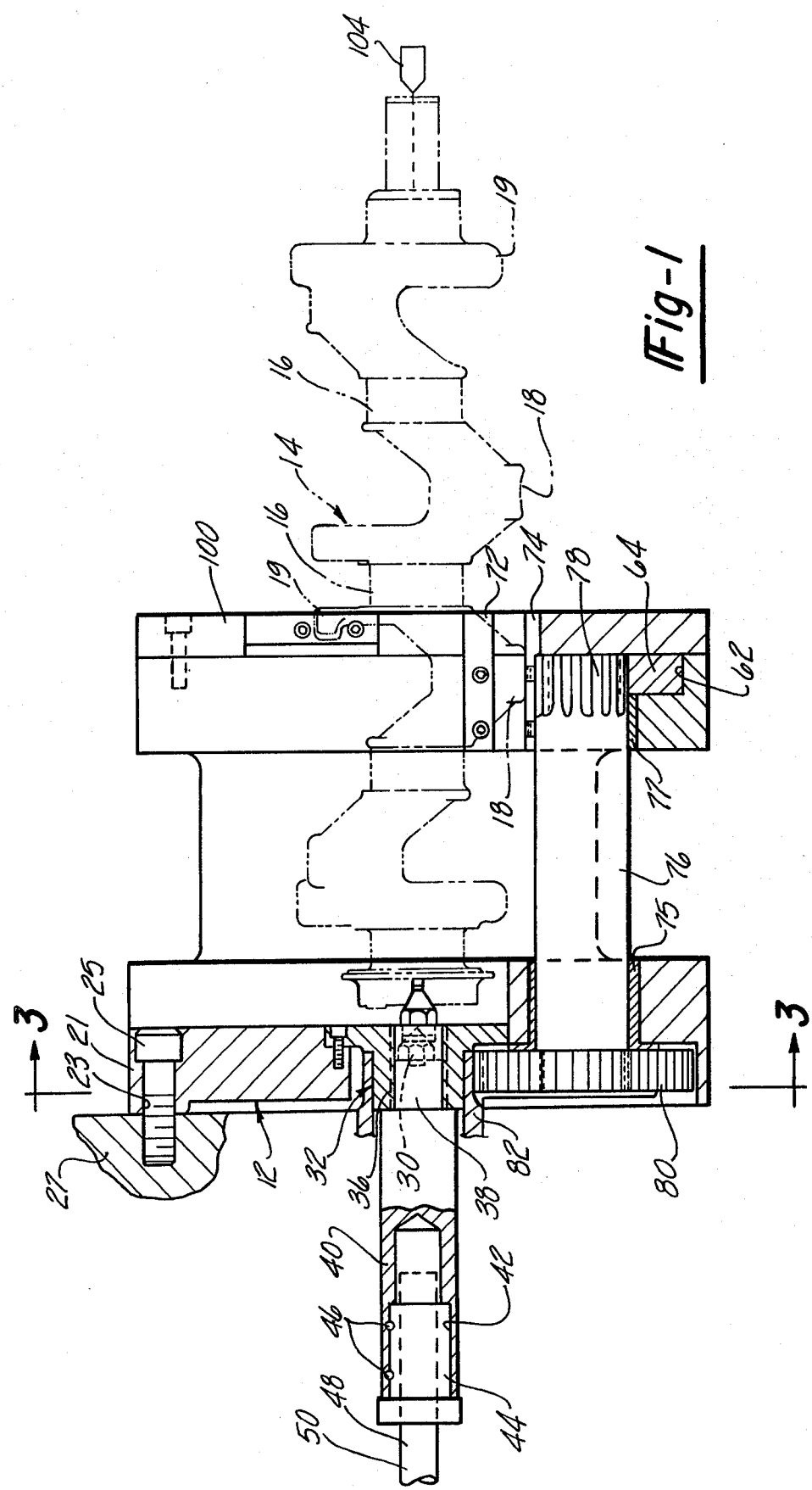
FIG. 1 is a sectional view taken substantially along line 1—1 in FIG. 2.

Referring first to FIG. 1, a preferred embodiment of the present invention is thereshown and comprises a frame 12 for supporting a crankshaft 14 having main bearings 16, crank pins 18 and counterweights 19. The frame 12 comprises a circular plate 21 having a plurality of axially extending and circumferentially spaced apertures 23 formed through it. Bolts 25 extend through these apertures 23 and secure the frame 12 to a spindle 27.

A center 30 is axially slidably mounted to the frame 12 through a flanged sleeve member 32. Rotation of the center 30 with respect to the sleeve 32, and thus, the frame 12, is prevented by means of a splined connection 36 which still permits axial displacement of the center 30 with respect to sleeve 32. The center 30 is attached to a reduced diameter portion 38 of a center quill shaft 40 which extends coaxially into the sleeve 32.

An axial bore 42 is formed in the other end of the shaft 40 and a nut 44 is secured in the bore 44 by keys 46. A threaded shaft 48 threadably engages the nut 44 while a motor 50, illustrated only diagrammatically, upon acutuation, rotates the shaft 48. Thus, rotation of the shaft 48 axially displaces the shaft 40 and its attached center 30.

Figures 2, 3:
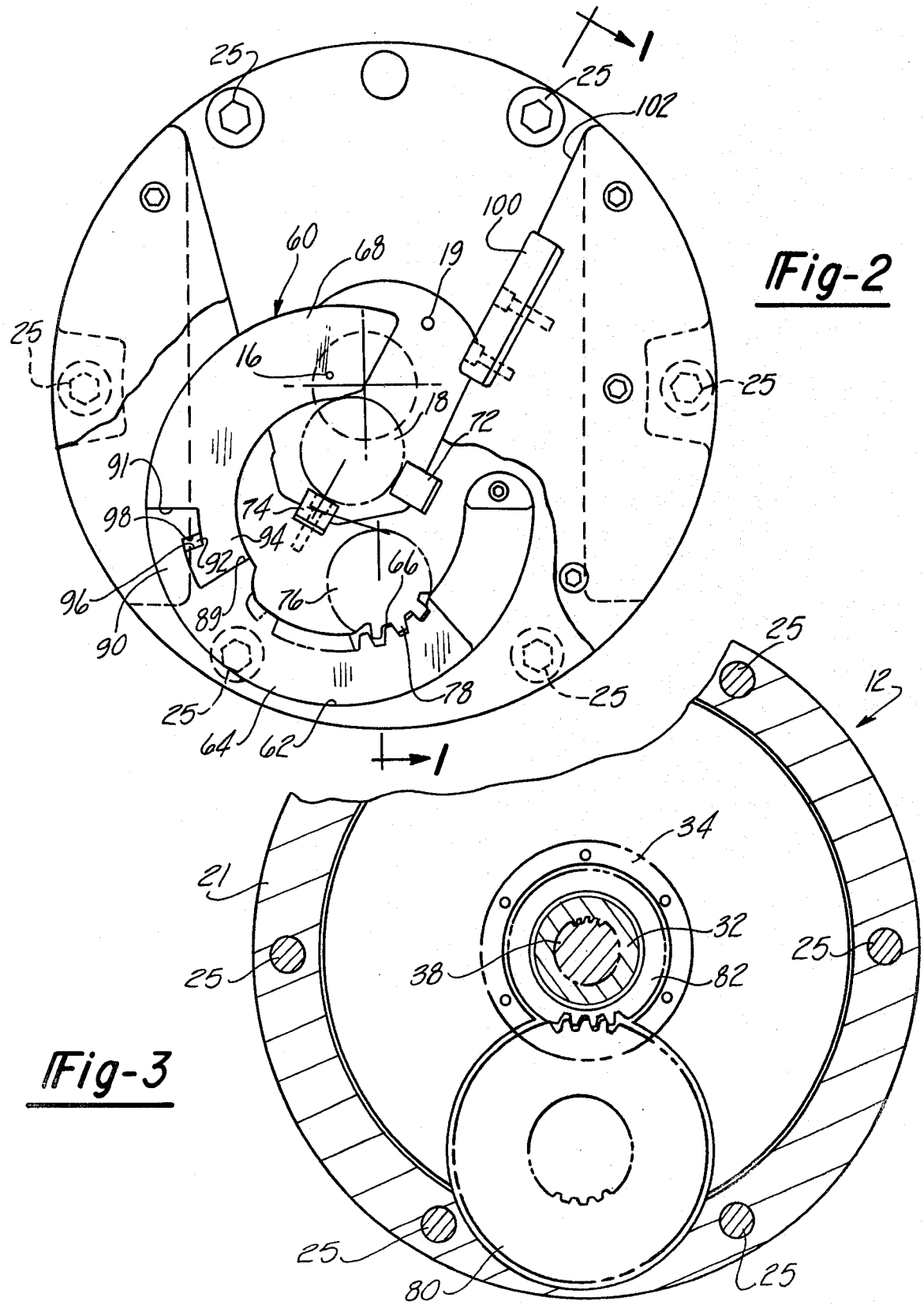
FIG. 2 is a side plan view of the chuck mechanism of the present invention.
FIG. 3 is a sectional view taken substantially along the line 3—3 in FIG. 1.

With reference now to FIG. 2, an arcuate jaw 60 is slidably mounted within an arcuate guide channel 62 (FIG. 1) formed in the frame 12. Preferably, the jaw 60 comprises an arcuate ring gear sector 64 having gear teeth 66 and an arcuate jaw arm sector 68 which are positioned circumferentially adjacent each other.

Referring now to FIGS. 1 and 2, a pair of workpiece supports or stop blocks 72 and 74 are mounted to the frame 12 at a position below the centerline of the crankshaft 14 and are axially spaced from the center 30 and so that the blocks 72 and 74 abut against a crank pin 18 of the crankshaft 14 as best shown in FIG. 2. An axially extending shaft 76 is rotatably mounted beneath the stop blocks 72 and 74 to the frame 12 by bearings 75 and 77 (FIG. 1) and includes a first gear end 78 which is positioned beneath the stop blocks 72 and 74. The gear end 78 of the shaft 76 meshes with the teeth 66 of the ring gear sector 64 so that rotation of the shaft 76 annularly displaces the ring gear sector 64 in the channel 62. An annular gear 80 (FIGS. 1 and 3) is attached to the end of the shaft 76 opposite the gear end 78. A toothed sleeve 82 is rotatably mounted around the sleeve 32 and meshes with the gear 80 while a reversible motor 84, shown diagrammatically in FIG. 1, rotatably drives the sleeve 82.

Referring now to FIG. 2, the ring gear sector 64 has an end 89 and an arcuately elongated, narrow portion 90 having a radially inwardly extending flange portion 92 at its free end. An adjacent end 91 of the arm sector 68 includes an arcuately elongated portion 94 having a radially outwardly extending flange 96 at its free end. The flanges 92 and 96 are narrower than the arcuate portions 90 and 94, respectively, so that a space 98 is formed between the flanges 92 and 96 when the ends of the jaw arm sector 68 and the ring gear sector 64 abut.

Still referring to FIG. 2, a workpiece pillow 100 is secured to the frame 12 at a position laterally spaced from and above the stop blocks 72 and 74 such that as can best be seen in FIG. 1 the crankshaft counterweight 19 abuts against the pillow 100.

The operation of the present invention will now be described. With the center 30 in its retracted position, the crankshaft 14 is fed into an opening 102 (see FIG. 2) in the frame 12 so that the crank pin 18 of the crankshaft 14 rests upon the stop blocks 72 and 74 and one axial end of the crankshaft 14 faces the center 30. The shaft 48 is then rotatably driven by the motor 50 to axially move the center 30 to its extended position and into engagement with the centering hole (not shown) in the end of the crankshaft 14. Another center 104 engages the opposite end of the crankshaft 14.

The sleeve 82 is then rotatably driven by the motor 84 in a counterclockwise direction, as shown in FIG. 3, to thereby produce clockwise rotation of the sprocket 80 and its attached shaft 76. The rotation of the shaft 76 arcuately displaces the ring gear sector 64 within the channel 62 in a clockwise direction (FIG. 2). With the ring gear sector 64 turning in a clockwise direction, the end 89 of the ring gear sector 64 abuts against the outer edge of the flange 96 of jaw arm sector 68 while the outer edge of the flange 98 abuts against the end 91 of the jaw arm sector 68. Consequently, the jaw arm sector 68 rotates in an arcuate path toward and against the top of the crank pin 18 on the crankshaft 14, whereupon a jaw face position at the end of jaw arm sector 68 presses the crank pin 18 downwardly against the stop blocks 72 and 74 as shown in FIG. 7. At the same time, one crankshaft counterweight 19 urged against the pillow block 100. In this, fashion, the crankshaft 14 is clamped within the frame 12 and fixed for rotation to the spindle 27. As the spindle 27 rotates, a cutting tool engages the exposed main bearings 16 of the crankshaft 14.

When the machining operation has been completed, the sleeve 82 is then rotated by the motor 84 in the opposite or clockwise direction (as shown in FIG. 3) to cause the ring gear sector 64 to move in counterclockwise direction (FIG. 2) and to retract within the channel 62. Since the inner surface of the flange 92 is spaced apart from the inner surface 96, the ring gear sector 64 retracts a predetermined amount into the channel 62 without displacing the jaw arm sector 68. However, once the ring gear sector 64 has been displaced a distance equal to the gap 98, the inner surface of the flange 92 slaps against the inner surface of the flange 96 with an impact sufficient to break the jaw sector 68 from the crank pin 18. The ring gear sector 64 and jaw arm sector 68 continue to retract within the channel 62 to free the crankshaft 14 for removal through the opening 102 in the frame 12.

Although the preferred embodiment of the present invention has been particularly described with respect to the machining of the main bearing portions 16 of the crankshaft 14, it is to be understood that the chuck mechanism is easily adaptable for use in machining the crank pin portions 18 of the crankshaft 14 or even for machining other workpieces. For instance, it can be seen that stop blocks 72 and 74 and the pillow 100 are secured to the frame 12 by bolts so that they are easily replaced with other blocks dimensioned to hold a differently sized crankshaft or to reposition the crankshaft 14 with respect to the center of rotation of the frame 12. Moreover, the particular size of the jaw arm sector 68 can be varied so as to engage a workpiece at a predetermined position.

It is also to be understood that each motor 50 and 84 can comprise separate rotary drive motors or, alternatively, a single motor operatively connected by a suitable transmission means. In either case, it is only necessary that both motors 50 and 84 or the single motor use in their place be reversible.

In any event, it is clear that the present invention provides a chuck mechanism which can utilize rotary force to drive the chuck mechanism so that linear displacement actuators and their inherent disadvantages can be avoided. Moreover, the present invention provides a chuck mechanism which overcomes the problem of releasing the jaw from its wedged, workpiece holding position.

Having thus described my invention, many modifications thereto will be become apparent to those skilled in the art to which it pertains without departing from the scope and spirit of the present invention as defined in the appended claims.

What is claimed is:

1. A chuck mechanism for stably supporting a workpiece during a machining operation upon the workpiece comprising:
    a frame;
    at least one workpiece support secured to said frame;
    an arcuate clamping jaw on said frame; and
    means on said frame for reversibly displacing said clamping jaw between a first rotational position in which said jaw is spaced apart from said workpiece support whereby a workpiece can be placed between said jaw and said at least one support, and a second rotational position, in which said jaw presses said workpiece against said at least one support,
    wherein said frame includes an annular channel in which said clamping jaw is annularly slidably mounted, and
    wherein said jaw further comprises two annular sectors, positioned circumferentially adjacent each other in said channel, one of said sectors being displaced by said means for displacing and means for enabling only limited movement between said sectors for providing a sudden impact against the other of said sectors when said one sector is displaced.

2. The invention as defined in claim 1 wherein said last mentioned means further comprises overlapping flanges formed on the adjacent ends of said sectors.

3. A chuck mechanism for stably supporting a workpiece during a machining operation upon the workpiece comprising:
    a frame;
    at least one workpiece support secured to said frame;
    an arcuate clamping jaw on said frame having an arcuate arm portion and a clamping surface formed at one end of said arm portion along a limited end portion of the inner periphery of said arcuate arm portion; and
    means on said frame for reversibly arcuately driving said clamping jaw through an arcuate path coinciding with the arc of said clamping jaw between a first rotational position in which said jaw is spaced apart from said workpiece support whereby a workpiece can be placed between said jaw and said at least one support, an a second rotational position, in which said jaw presses said workpiece against said at least one support; and
    wherein said jaw further comprises two annular sectors positioned circumferentially adjacent each other on said frame, one of said sectors being driven by said means for driving, and means for enabling only limited movement between said sectors for providing a sudden impact against the other of said sectors when said one sector is displaced.

4. The invention as defined in claim 3 wherein said clamping jaw includes an annular gear rack portion and wherein said driving means further comprises a shaft rotatably mounted in said frame, a gear tooth portion at one end of said shaft which meshes with said gear rack, and means for rotatably driving said shaft.

5. The invention as defined in claim 4 wherein said shaft is aligned with its axis parallel to the axis of said annular gear rack portion.

6. The invention as defined in claim 3 and further comprising a center adapted to engage one end of a workpiece and means for axially moving said center between a nonworkpiece engaging retracted position and a workpiece engaging extended position.

7. The invention as defined in claim 6 wherein said last mentioned means further comprises a rod secured at one end to said center, a nut attached to the other end of the rod, a threaded shaft which threadably engages said nut, and means for rotatably driving said shaft.

8. The invention as defined in claim 3 wherein said last mentioned means further comprises overlapping flanges formed on the adjacent ends of said sectors.

9. A chuck mechanism for stably supporting a workpiece during a machining operation upon the workpiece comprising:
    a frame;
    at least one workpiece support secured to said frame;
    an arcuate clamping jaw having an arcuate arm portion and a clamping surface formed at one end of said arm portion along a limited end portion of the inner periphery of said arcuate arm portion; and
    means on said frame for reversibly arcuately driving said clamping jaw through an arcuate path coinciding with the arc of said arcuate arm portion between a first rotational position in which said jaw is spaced apart from said workpiece support whereby a workpiece can be placed between said jaw and said at least one support, and a second rotational position, in which said jaw presses said workpiece against said at least one support,
    wherein said frame includes an annular channel in which said clamping jaw is annularly slidably mounted, and
    wherein said jaw further comprises two annular sectors positioned circumferentially adjacent each other in said channel and means for enabling only limited movement between said sectors,
    said last mentioned means further comprising overlapping flanges formed on the adjacent ends of said sectors.

10. A chuck mechanism for stably supporting a workpiece during a machining operation upon the workpiece comprising:
    a frame;
    at least one workpiece support secured to said frame;
    an arcuate clamping jaw; and
    means on said frame for reversibly displacing said clamping jaw between a first rotational position in which said jaw is spaced apart from said workpiece support whereby a workpiece can be placed between said jaw and said at least one support, and a second rotational position, in which said jaw presses said workpiece against said at least one support,
    wherein said frame includes an annular channel in which clamping jaw is annularly slidably mounted, and
    wherein said jaw further comprises two annular sectors positioned circumferentially adjacent each other in said channel and means for enabling only limited movement between said sectors,
    said last mentioned means further comprising overlapping flanges formed on the adjacent ends of said sectors.

11. A chuck mechanism for stably supporting a workpiece during a machining operation upon the workpiece comprising:
- a frame;
- at least one workpiece support secured to said frame;
- an arcuate clamping jaw on said frame having an arcuate arm portion and a clamping surface formed at one end of said arm portion along a limited end portion of the inner periphery of said arcuate arm portion; and
- means on said frame for reversibly arcuately driving said clamping jaw through an arcuate path coinciding with the arc of said clamping jaw between a first rotational position in which said jaw is spaced apart from said workpiece support whereby a workpiece can be placed between said jaw and said at least one support, and a second rotational position, in which said jaw presses said workpiece against said at least one support; and
- wherein said jaw further comprises two annular sectors positioned circumferentially adjacent each other on said frame, and means for enabling only limited movement between said sectors,
- said last mentioned means further comprising overlapping flanges formed on the adjacent ends of said sectors.

* * * * *